US010015095B2

United States Patent
Li

(10) Patent No.: US 10,015,095 B2
(45) Date of Patent: Jul. 3, 2018

(54) FLOW TABLE-BASED TABLE ENTRY ADDRESSING METHOD, SWITCH, AND CONTROLLER

(71) Applicant: HUAWEI TECHNOLOGIES CO., LTD., Shenzhen (CN)

(72) Inventor: Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 171 days.

(21) Appl. No.: 15/157,791

(22) Filed: May 18, 2016

(65) Prior Publication Data
US 2016/0269287 A1    Sep. 15, 2016

Related U.S. Application Data

(63) Continuation of application No. PCT/CN2013/087434, filed on Nov. 19, 2013.

(51) Int. Cl.
*H04L 12/741* (2013.01)
*H04L 12/935* (2013.01)
(Continued)

(52) U.S. Cl.
CPC .......... *H04L 45/745* (2013.01); *H04L 41/083* (2013.01); *H04L 45/64* (2013.01);
(Continued)

(58) Field of Classification Search
None
See application file for complete search history.

(56) References Cited

U.S. PATENT DOCUMENTS

2006/0294340 A1    12/2006   Baker
2010/0020806 A1*   1/2010    Vahdat ................ H04L 45/00
                                                         370/395.31
(Continued)

FOREIGN PATENT DOCUMENTS

CN         1859208 A       11/2006
CN         101267331 A      9/2008
(Continued)

OTHER PUBLICATIONS

Chinese Office Action dated Jun. 1, 2017 in corresponding Chinese Patent Application No. 201380002319.1.
(Continued)

*Primary Examiner* — Anh Ngoc M Nguyen
(74) *Attorney, Agent, or Firm* — Staas & Halsey LLP

(57) ABSTRACT

The present application provides a flow table-based table entry addressing method, a switch, and a controller. The method includes: receiving, by a switch, a packet; matching, by the switch, the packet based on a previous flow table; after matching is successful, sending, by the switch based on a write storage index instruction in a flow table entry that is successfully matched, storage index information along with the packet to a lower-level flow table, where the storage index information corresponds to a flow table entry in the lower-level flow table, and the write storage index instruction is sent by a controller; and directly addressing, by the switch in the lower-level flow table based on the storage index information, the flow table entry corresponding to the storage index information.

19 Claims, 11 Drawing Sheets

(51) Int. Cl.
  *H04L 12/715* (2013.01)
  *H04L 12/931* (2013.01)
  *H04L 29/06* (2006.01)
  *H04L 12/24* (2006.01)

(52) U.S. Cl.
  CPC .......... *H04L 49/3009* (2013.01); *H04L 49/35* (2013.01); *H04L 69/161* (2013.01)

(56) References Cited

U.S. PATENT DOCUMENTS

| | | | | |
|---|---|---|---|---|
| 2013/0170495 A1* | 7/2013 | Suzuki | ............... | H04L 49/3009 370/392 |
| 2013/0176850 A1* | 7/2013 | Mishra | .................. | H04L 49/00 370/235 |
| 2013/0275592 A1 | 10/2013 | Xu et al. | | |
| 2014/0040459 A1* | 2/2014 | Agrawal | ................ | H04L 45/14 709/224 |
| 2014/0119189 A1 | 5/2014 | Lin | | |

FOREIGN PATENT DOCUMENTS

| | | |
|---|---|---|
| CN | 101540723 A | 9/2009 |
| CN | 101594319 A | 12/2009 |
| CN | 102301663 A | 12/2011 |

OTHER PUBLICATIONS

PCT International Search Report dated Jul. 9, 2014 corresponding International Patent Application No. PCT/CN2013/087434.
Extended European Search Report dated Oct. 17, 2016 corresponding European Patent Application No. 13897999.2.
Le et al., "A SRAM-based Architecture for Trie-based IP Lookup Using FPGA", 16th International Symposium on Field-Programmable Custom Computing Machines, IEEE Computer Society, 2008 (10 pages).
"OpenFlow Switch Specification", Open Networking Foundation, Version 1.4.0 (Wire Protocol 0x05), Oct. 2013 (206 pages).
International Search Report dated Jul. 9, 2014, in corresponding International Application No. PCT/CN2013/087434.

\* cited by examiner

FLOW TABLE-BASED TABLE ENTRY ADDRESSING METHOD, SWITCH, AND CONTROLLER

CROSS-REFERENCE

This application is a continuation of International Application No. PCT/CN2013/087434, filed Nov. 19, 2013, which is hereby incorporated by reference in its entirety.

TECHNICAL FIELD

The present application relates to the field of communications technologies, and in particular, to a flow table-based table entry addressing method, a switch, and a controller.

BACKGROUND

On a present telecommunications network, there are many complex network devices, such as routers, gateways, switches, firewalls, and various types of servers. These devices separately support various types of network protocols to implement interconnection and interworking between network elements. Each device includes an internal packet forwarding module and various types of protocol control modules. This distributed control module deployment manner makes network deployment and management very complicated. To implement modification or an upgrade of a certain control parameter, a network operator must perform operations separately on each device.

To achieve network element deployment flexibility and manageability, the software-defined networking (SDN) concept is raised in the industry. In the SDN, control logic and forwarding functions of network elements are decoupled and the control logic is deployed in a centralized manner, so that network control and maintenance work can be implemented simply by operating control-plane devices, thereby increasing network management efficiency and simplifying forwarding-plane devices to facilitate implementation of high performance and reusability of forwarding devices. Currently, the SDN idea is being widely applied to data center networks and telecommunications networks. The Openflow protocol is the most typical and most widely used protocol on SDN networks.

Network elements in the Openflow protocol include Openflow controllers (OF Controller, controller for short) and Openflow switches (OF Switch, switch for short), where, a controller is responsible for determining, according to packet characteristics (such as an IP 5-tuple, an Ethernet frame header, and a virtual local area network ID), forwarding actions (such as forwarding, discarding, modifying a packet header, encapsulating, and decapsulating) of a service flow, and delivering a corresponding flow rule (including flow matching information (such as an IP 5-tuple and an Ethernet frame header) and corresponding executed actions) to a switch. The switch acquires and stores the flow rule and executes corresponding actions for subsequent packets that comply with the flow rule, thereby implementing packet forwarding or processing. A basic process for delivering a flow rule is shown in FIG. 1a.

In step 1, a controller sends a flow table entry to a switch by using a Flow_Mod (flow table modification) message, where, the flow table entry includes flow matching content (flow match) and corresponding processing actions (actions). The flow matching information includes a combination of any information of an Ethernet frame header, IP header information, and a TCP/UDP port number, and the processing actions include processing types and relevant parameters. Processing types are, for example, forwarding, discarding, modifying, encapsulating, and decapsulating. The controller may deliver flow table entries that belong to different flow tables to the switch by using multiple Flow_Mod messages. In FIG. 1a, the controller separately sends flow table entries of two tables to the switch.

Then, the step 2 is executed. That is, the switch stores (installs) all the flow table entries and the processing actions in corresponding flow tables.

After that, the step 3 is executed. That is, when a user packet arrives, the switch implements multi-level flow table matching and performs, according to the processing actions corresponding to matched flow table entries, serial processing on the packet. For the multi-level flow table matching and processing process, refer to FIG. 1b.

First, a packet enters a switch from a certain input port, and the switch matches flow table entries of a table 0 (table0) against the packet first, and performs, after a certain flow table entry is matched, an operation on the packet according to an instruction of the flow table entry. If a flow table entry has multiple instructions, the instructions are executed according to a certain sequence (goto-table is executed last). If an instruction has Goto-Table, the packet and optional metadata are sent to a next flow table, the next flow table is further matched against the packet or metadata, and subsequent instruction processing is performed. If an instruction does not have goto-table, it indicates that exiting from the pipeline is needed, and the switch executes a processing action set of saving actions, where, the set includes actions such as packet modification, forwarding a packet to a certain port, or packet discarding.

In the prior art, to increase flow table entry addressing efficiency, a manner of implementing flow table entry addressing by means of metadata matching is provided, as shown in FIG. 1c. A controller generates various table entries matching metadata in a flow table 2. Write metadata instructions are added to table entries in a flow table 1. After a packet arrives, the packet is matched against the table entries in the flow table 1. After matching is successful, corresponding metadata and the packet are transmitted to the flow table 2. The flow table 2 is matched against the corresponding metadata. After matching is successful, corresponding instructions are executed.

However, the present applicant finds, in the process of implementing the technical solutions in the embodiments of the present application, that in the method in the prior art for implementing flow table entry addressing by means of metadata matching: one manner is implementing matching and searching by using metadata content, which requires dedicated hardware for implementation, and therefore the cost is relatively high; and another manner is implementing a hash (hash) operation on metadata to obtain table entry indexes in a next table, which requires an extra hash operation and in addition a solution to a hash operation conflict problem (hash operation conflict means that a same value is obtained after hash operations are performed on different metadata), thereby causing relatively low hash operation implantation efficiency (an extra hash operation) and complicated operations (extra processing is required when a hash conflict occurs). Therefore, in the prior art, there are technical problems of relatively low flow table entry addressing efficiency, relatively complicated flow table entry matching, and relatively high costs caused by use of metadata matching.

SUMMARY

The present application provides a flow table-based table entry addressing method, a switch, and a controller for resolving the technical problems, in the prior art, of relatively low flow table entry addressing efficiency and relatively complicated flow table entry matching caused by use of metadata matching.

A first aspect of the present application provides a flow table-based table entry addressing method, including: receiving, by a switch, a packet; matching, by the switch, the packet based on a previous flow table; after matching is successful, sending, by the switch based on a write storage index instruction in a flow table entry that is successfully matched, storage index information along with the packet to a lower-level flow table, where, the storage index information corresponds to a flow table entry in the lower-level flow table and the write storage index instruction is sent by a controller; and directly addressing, by the switch in the lower-level flow table based on the storage index information, the flow table entry corresponding to the storage index information.

With reference to the first aspect, in a first possible implementation manner of the first aspect, before the receiving, by a switch, a packet, the method further includes: receiving, by the switch, the successfully matched flow table entry that carries the write storage index instruction and is sent by the controller, where, a parameter of the write storage index instruction includes the storage index information.

With reference to the first possible implementation manner of the first aspect, in a second possible implementation manner of the first aspect, before the receiving, by the switch, the successfully matched flow table entry that carries the write storage index instruction and is sent by the controller, the method further includes: receiving, by the switch, a message of generating or modifying a flow table entry in the lower-level flow table and sent by the controller, where, the message carries a return storage index indication; and sending, by the switch based on the return storage index indication, the storage index information corresponding to the flow table entry of the lower-level flow table to the controller.

With reference to the first possible implementation manner of the first aspect or the second possible implementation manner of the first aspect, in a third possible implementation manner of the first aspect, the write storage index instruction is specifically: a newly defined operation instruction or a write metadata instruction; and the sending storage index information along with the packet to a lower-level flow table is specifically: writing the storage index information in fixed bits of metadata and sending the metadata along with the packet to the lower-level flow table.

With reference to the first aspect or any one of the first possible implementation manner of the first aspect to the third possible implementation manner of the first aspect, in a fourth possible implementation manner of the first aspect, the storage index information includes address information of the flow table entry of the lower-level flow table, or address information of the flow table entry of the lower-level flow table and a flow table identifier of the lower-level flow table.

With reference to the fourth possible implementation manner of the first aspect, in a fifth possible implementation manner, the flow table identifier of the lower-level flow table is specifically generated by the switch or the controller.

With reference to the first aspect, or any one of the first possible implementation manner of the first aspect to the fifth possible implementation manner of the first aspect, in a sixth possible implementation manner of the first aspect, the method further includes:

sending, by the switch, a flow table entry release message to the controller to inform the controller that the flow table entry in the lower-level flow table needs to be released;

locking, by the switch, the flow table entry in the lower-level flow table;

receiving, by the switch, a deletion message that is generated based on the release message and sent by the controller, and deleting the write index instruction from another flow table entry that uses the storage index information;

sending, by the switch after deletion is completed, a deletion response message to the controller;

receiving, by the switch, a release acknowledgement message that is generated by the controller based on the deletion response message; and unlocking, by the switch based on the release acknowledgement message, the flow table entry in the lower-level flow table.

With reference to the sixth possible implementation manner of the first aspect, in a seventh possible implementation manner of the first aspect, during the locking, by the switch the flow table entry of the lower-level flow table, the method further includes:

discarding, by the switch, the packet; or sending, by the switch, a packet message to the controller, where, the packet message carries the packet, the storage index information, and a cause value of invalid storage index information.

A second aspect of the present application provides a flow table-based table entry addressing method, including: sending, by a controller, a first message of generating or modifying a flow table entry in a lower-level flow table, to a switch, where, the first message carries a return storage index indication; receiving, by the controller, storage index information, of a flow table entry of the lower-level flow table, which is returned by the switch based on the return storage index indication; and sending, by the controller, a second message of modifying or creating a flow table entry of a previous flow table to the switch, where, the second message carries a write storage index instruction, and a parameter of the write storage index instruction includes the storage index information, so that the switch can directly address, in the lower-level flow table based on the storage index information, the flow table entry corresponding to the storage index information.

With reference to the second aspect, in a first possible implementation manner of the second aspect, the write storage index instruction is specifically: a newly defined operation instruction or a write metadata instruction, where, the storage index information is written in fixed bits of metadata.

With reference to the second aspect or the first possible implementation manner of the second aspect, in a second possible implementation manner of the second aspect, the storage index information includes address information of the flow table entry of the lower-level flow table, or address information of the flow table entry of the lower-level flow table and a flow table identifier of the lower-level flow table.

With reference to the second possible implementation manner of the second aspect, in a third possible implementation manner of the second aspect, the flow table identifier of the lower-level flow table is specifically generated by the switch or the controller.

With reference to the second aspect or any one of the first possible implementation manner of the second aspect to the third possible implementation manner of the second aspect, in a fourth possible implementation manner of the second aspect, after the sending, by the controller, a second message of modifying or creating a flow table entry of a previous flow table to the switch, the method further includes: receiving, by the controller, a flow table release message sent by the switch; sending, by the controller based on the flow table release message, a deletion message to the switch, so that the switch can delete, based on the deletion message, the write index instruction from another flow table entry that uses the storage index information; receiving, by the controller, deletion response information sent by the switch, where, the deletion response information indicates that the switch has completed the deletion; and generating, by the controller based on the deletion response information, a release acknowledgement message and sending the release acknowledgement message to the switch, so that the switch unlocks the flow table entry in the lower-level flow table.

With reference to the fourth possible implementation manner of the second aspect, in a fifth possible implementation manner of the second aspect, after the receiving, by the controller, a flow table release message sent by the switch, the method further includes: receiving, by the controller, a packet message sent by the switch, where, the packet message carries a packet, the storage index information, and a cause value of invalid storage index information.

A third aspect of the present application provides a switch, including:

an interface, configured to receive a packet; a processor, configured to match the packet based on a previous flow table, send, after the matching is successful, based on a write storage index instruction in a flow table entry that is successfully matched, storage index information along with the packet to a lower-level flow table, where, the storage index information corresponds to a flow table entry in the lower-level flow table and the write storage index instruction is sent by a controller, and further directly address, in the lower-level flow table based on the storage index information, the flow table entry corresponding to the storage index information.

With reference to the third aspect, in a first possible implementation manner of the third aspect, the switch further includes: a receiver, configured to receive the successfully matched flow table entry that carries the write storage index instruction and is sent by the controller, where, a parameter of the write storage index instruction includes the storage index information.

With reference to the first possible implementation manner of the third aspect, in a second possible implementation manner of the third aspect, the switch further includes a sender, and the receiver is further configured to receive a message of generating or modifying a flow table entry in the lower-level flow table and sent by the controller, where, the message carries a return storage index indication, and the sender is specifically configured to send, based on the return storage index indication, the storage index information corresponding to the flow table entry of the lower-level flow table to the controller.

With reference to the first possible implementation manner of the third aspect or the second possible implementation manner of the third aspect, in a third possible implementation manner of the third aspect, the write storage index instruction is specifically a write metadata instruction and the processor is specifically configured to write the storage index information in fixed bits of metadata and send the metadata along with the packet to the lower-level flow table.

With reference to the third aspect, in a fourth possible implementation manner of the third aspect, the switch further includes a sender and a receiver, where the sender is configured to send a flow table entry release message to the controller to inform the controller that the flow table entry in the lower-level flow table needs to be released and send, after deletion is completed, a deletion response message to the controller, and the receiver is configured to receive a deletion message that is generated based on the release message and sent by the controller, and receive a release acknowledgement message generated by the controller based on the deletion response message. The processor is further configured to lock, after the sender sends the flow table entry release message, the flow table entry in the lower-level flow table, delete, after the receiver receives the deletion message, the write index instruction from another flow table entry that uses the storage index information, and unlock, after the receiver receives a release acknowledgement message, the flow table entry in the lower-level flow table.

With reference to the fourth possible implementation manner of the third aspect, in a fifth possible implementation manner of the third aspect, when the switch locks the flow table entry in the lower-level flow table, the processor is further configured to discard the packet, or the sender is further configured to send a packet message to the controller, where, the packet message carries the packet, the storage index information, and a cause value of invalid storage index information.

A fourth aspect of the present application provides a type of controller, including:

a sender, configured to send a first message of generating or modifying a flow table entry in a lower-level flow table, to a switch, where, the first message carries a return storage index indication, and further configured to send a second message of modifying or creating a flow table entry of a previous flow table to the switch, where, the second message carries a write storage index instruction; and a receiver, configured to receive storage index information, of a flow table entry of the lower-level flow table, which is returned by the switch based on the return storage index indication, where, a parameter of the write storage index instruction includes the storage index information, so that the switch can directly address, in the lower-level flow table based on the storage index information, the flow table entry corresponding to the storage index information.

With reference to the fourth aspect, in a first possible implementation manner of the fourth aspect, the receiver is further specifically configured to: receive a flow table release message sent by the switch, and receive deletion response information sent by the switch, where, the deletion response information indicates that the switch has completed deletion. The sender is further specifically configured to: send, based on the flow table release message, a deletion message to the switch, so that the switch can delete, based on the deletion message, the write index instruction from another flow table entry that uses the storage index information; and generate a release acknowledgement message based on the deletion response information and send the release acknowledgement message to the switch, so that the switch unlocks the flow table entry in the lower-level flow table.

With reference to the first possible implementation manner of the fourth aspect, in a second possible implementation manner of the fourth aspect, the receiver is further specifically configured to receive a packet message sent by the switch, where, the packet message carries a packet, the storage index information, and a cause value of invalid storage index information.

One or more technical solutions provided by embodiments of the present application have at least the following technical effects or advantages:

In the embodiments of the present application, a switch receives a packet; the switch matches the packet based on a previous flow table; after matching is successful, the switch sends, based on a write storage index instruction in a flow table entry that is successfully matched, storage index information along with the packet to a lower-level flow table, where, the storage index information corresponds to a flow table entry in the lower-level flow table, and the write storage index instruction is sent by a controller; and the switch directly addresses, in the lower-level flow table based on the storage index information, the flow table entry corresponding to the storage index information. Therefore, in the embodiments of the present application, first, a flow table entry of a previous flow table has a write storage index instruction, and storage index information can be sent, based on the write storage index instruction, along with a packet to a lower-level flow table. Then, when the lower-level flow table receives the packet, a flow table entry corresponding to the storage index information may be directly located according to the storage index information without a need of implementing content matching one by one or implementing addressing by means of a hash operation in the lower-level flow table, which can therefore resolve the technical problems of low efficiency, complicated operations, and high costs caused by use of metadata matching, achieve the technical effects of increasing a packet processing speed and reducing packet processing delays, and enable an open flow switch to achieve packet forwarding at higher line rates and lower device costs.

DESCRIPTION OF EMBODIMENTS

Figure 1A:
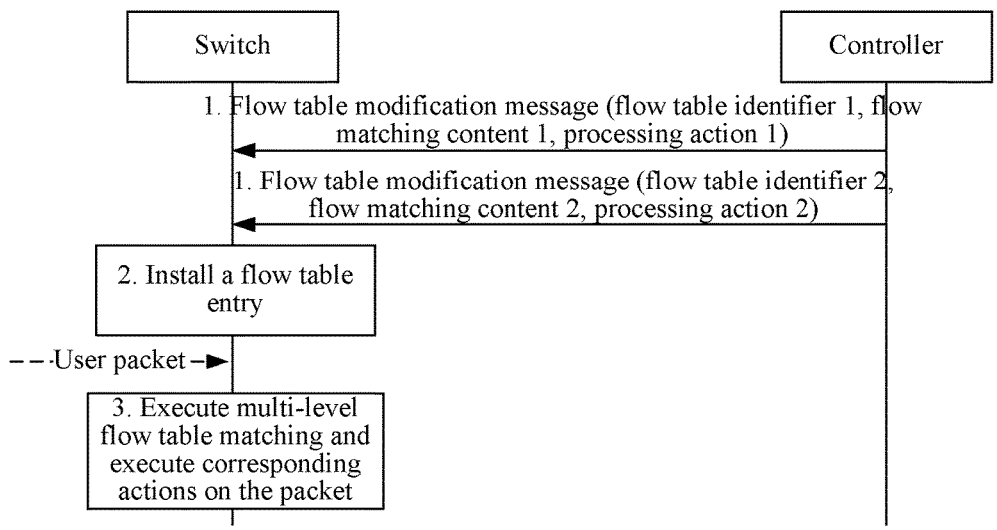
FIG. 1a to FIG. 1c are schematic diagrams of a flow table-based table entry addressing method according to the prior art.
Figure 1B:
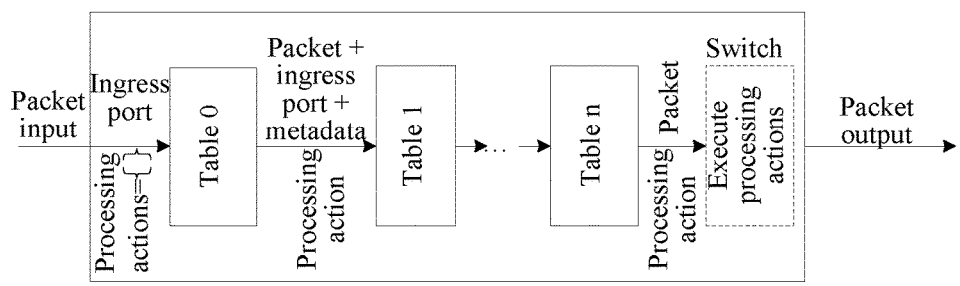
Figure 1C:
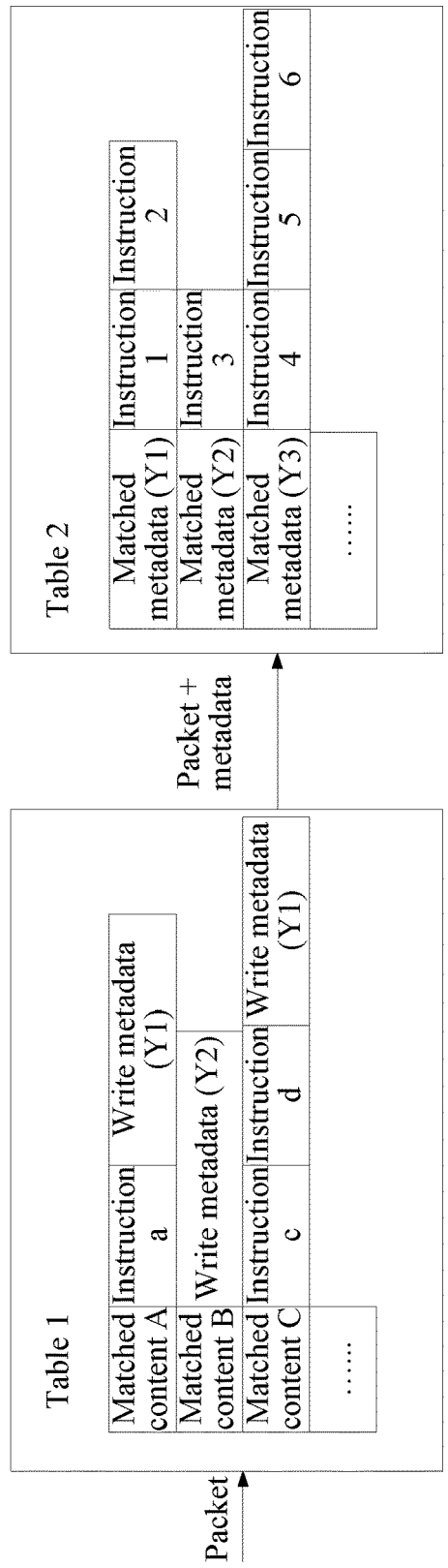

Embodiments of the present application provide a flow table-based table entry addressing method, a switch, and a controller for resolving the technical problems, in the prior art, of relatively low flow table entry addressing efficiency and relatively complicated flow table entry matching operations caused by use of content matching.

To resolve the foregoing technical problems, an overall idea of the technical solutions in the embodiments of the present application is as follows:

In the embodiments of the present application, a switch receives a packet; the switch matches the packet based on a previous flow table; after matching is successful, the switch sends, based on a write storage index instruction in a flow table entry that is successfully matched, storage index information along with the packet to a lower-level flow table, where, the storage index information corresponds to a flow table entry in the lower-level flow table, and the write storage index instruction is sent by a controller; and the switch directly addresses, in the lower-level flow table based on the storage index information, the flow table entry corresponding to the storage index information. Therefore, in the embodiments of the present application, first, a flow table entry of a previous flow table has a write storage index instruction and storage index information can be sent, based on the write storage index instruction, along with a packet to a lower-level flow table. Then, when the lower-level flow table receives the packet, a flow table entry corresponding to the storage index information may be directly located according to the storage index information without a need of implementing content matching one by one or implementing addressing by means of a hash operation in the lower-level flow table, which can therefore resolve the technical problems of low efficiency and complicated operations caused by use of metadata matching, achieve technical effects of increasing the a packet processing speed and reducing packet processing delays, and enable an open flow switch to achieve packet forwarding at higher line rates and lower device costs.

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

With reference to the accompanying drawings, the following describe in detail the preferable embodiments of the present application.

Embodiment 1

Figure 2:
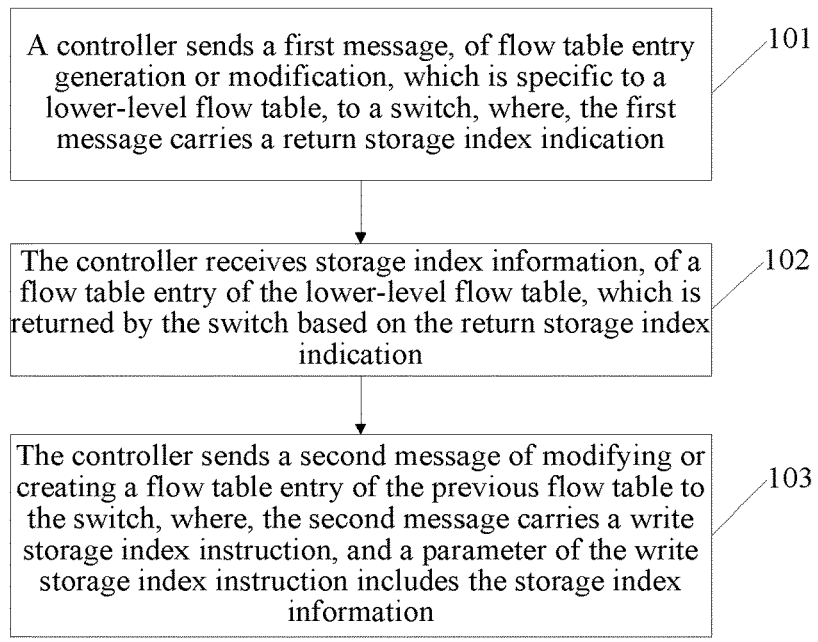
FIG. 2 is a flowchart of a flow table-based table entry addressing method on a controller side according to an embodiment of the present application.

This embodiment provides a flow table-based table entry addressing method. Referring to FIG. 2, FIG. 2 is a flowchart of the flow table-based table entry addressing method according to this embodiment, where, the method includes:

Step 101: A controller sends a first message of generating or modifying a flow table entry in a lower-level flow table, to a switch, where, the first message carries a return storage index indication.

Step 102: The controller receives storage index information, of a flow table entry of the lower-level flow table, which is returned by the switch based on the return storage index indication.

Step 103: The controller sends a second message of modifying or creating a flow table entry of a previous flow table to the switch, where, the second message carries a write storage index instruction, and a parameter of the write storage index instruction includes the storage index information, so that the switch can directly address, in the lower-level flow table based on the storage index information, the flow table entry corresponding to the storage index information.

Figure 3:
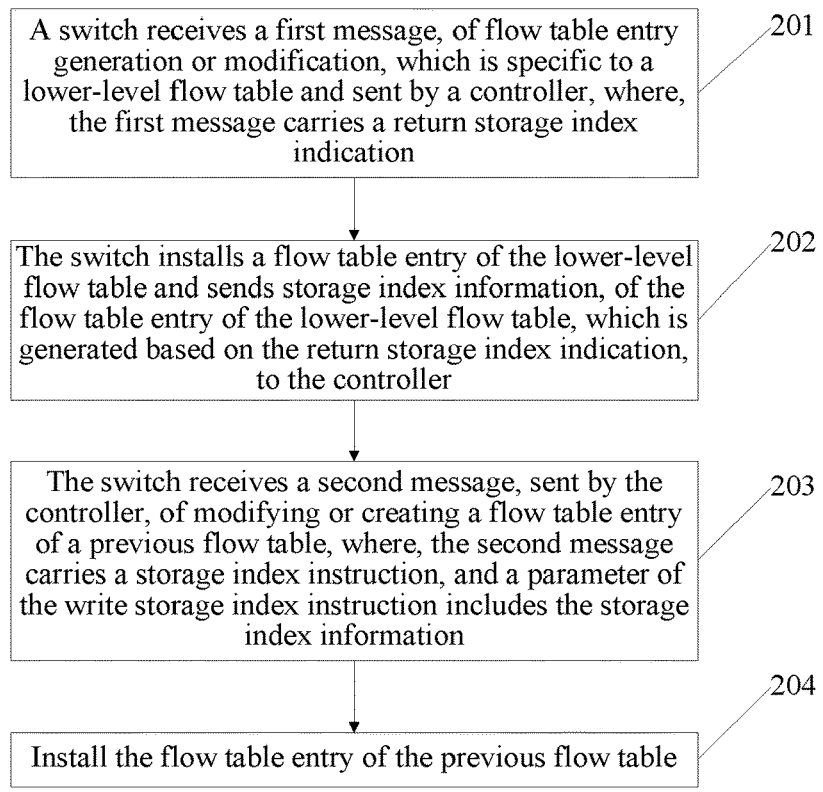
FIG. 3 is another schematic diagram of a process of a flow table-based table entry addressing method on a switch side according to an embodiment of the present application.

The method process shown in FIG. 2 is described from a controller side. Referring to FIG. 3, FIG. 3 is a flowchart of a flow table-based table entry addressing method on a switch side according to this embodiment. As shown in FIG. 3, the method includes:

Step 201: A switch receives a first message, sent by a controller, of generating or modifying a flow table entry in a lower-level flow table, where, the first message carries a return storage index indication.

Step 202: The switch installs a flow table entry of the lower-level flow table and sends storage index information, generated based on the return storage index indication, of the flow table entry of the lower-level flow table to the controller.

Step 203: The switch receives a second message, sent by the controller, of modifying or creating a flow table entry of a previous flow table, where, the second message carries a storage index instruction, and a parameter of the write storage index instruction includes the storage index information, so that the switch can directly address, in the lower-level flow table based on the storage index information, the flow table entry corresponding to the storage index information.

Step 204: Install the flow table entry of the previous flow table.

The following describes in detail, with reference to FIG. 2 and FIG. 3, the flow table-based table entry addressing method in this embodiment.

First, referring to FIG. 2, the controller executes step 101 first, that is, the controller sends the first message of generating or modifying a flow table entry in the lower-level flow table, to the switch, where, the first message carries the return storage index indication. Further, the first message many further include matched content. When the storage index information is used for direct indexing, content matching is not required. Nevertheless, when the previous flow table does not use the storage index information for direct indexing, the content matching manner may still be used to implement table entry addressing.

Furthermore, concepts of the lower-level flow table and the previous flow table in this embodiment of the present application are specified according to the matching sequence. The first matched is the previous flow table. After exiting from the previous flow table, a packet enters the lower-level flow table for processing. Therefore, the lower-level flow table and the previous flow table are relative rather than absolute concepts herein. Certainly, in a practical application, they may also be actually a lower-level flow table and an upper-level flow table, which are distinguished, for example, according to protocol layers, where, the upper-level flow table is for processing at the data link layer and the lower-level flow table is for processing at the protocol layer. Further, it should be specially noted that, the lower-level flow table is a flow table, after the previous flow table, where a packet is further processed. For example, a packet can be processed in a previous flow table 1, pass through a lower-level flow table 2, and then arrive at a lower-level flow table 3 that uses a table entry index. It is not required that the lower-level flow table 3 that uses the table entry index be right after the flow table 1.

Correspondingly, the switch executes step 201, that is, the switch receives a first message. When receiving the first message, the switch executes step 202, that is, it installs and/or modifies the flow table entry of the lower-level flow table, generates, according to the return storage index indication in the first message, the storage index information of the flow table entry of the lower-level flow table, and sends the storage index information to the controller, where, the storage index information may specifically be address information of the flow table entry, such as a memory location that stores the flow table entry, and may also be an offset specific to an initial memory location of the lower-level flow table. Further, when two or more than two flow tables use direct indexing, to distinguish a table of an entry from which address information comes, the storage index information further includes the flow table identifier of the lower-level flow table. The flow table identifier may be generated by the flow table and returned to the controller, and may also be generated by the controller, and the switch only needs to return address information. Certainly, in the practical application, the storage index information may also be other information, as long as a corresponding flow table entry may be directly indexed according the storage index information. Further, in the content matching manner, a flow table entry generation message does not have a response message. Therefore, in this embodiment of the present application, a response message is newly defined for returning the storage index information to the controller.

Correspondingly, the controller executes step 102, that is, the controller receives the storage index information returned by the switch, and executes, after receiving the storage index information, step 103, that is, the controller sends the second message of modifying or creating a flow table entry of the previous flow table to the switch, where, the second message carries the write storage index instruction, and a parameter of the write storage index instruction includes the storage index information, so that the switch can directly address, in the lower-level flow table based on the storage index information, the flow table entry corresponding to the storage index information. Certainly, the second message further carries matched content and instructions.

The write storage index instruction may specifically be a newly defined operation instruction, and existing metadata may also be reused to transmit the storage index information, so that an existing write metadata instruction can be used. In use, to prevent interrupting other flow tables that use metadata matching, metadata is formatted, and certain bits of the metadata are specified for direct indexing. For example, the bits 0 to 7 in metadata are used to deliver storage index information.

Correspondingly, the switch executes step 203, that is, the switch receives the second message, and then executes step 204 to install the flow table entry of the previous flow table.

Figure 4:
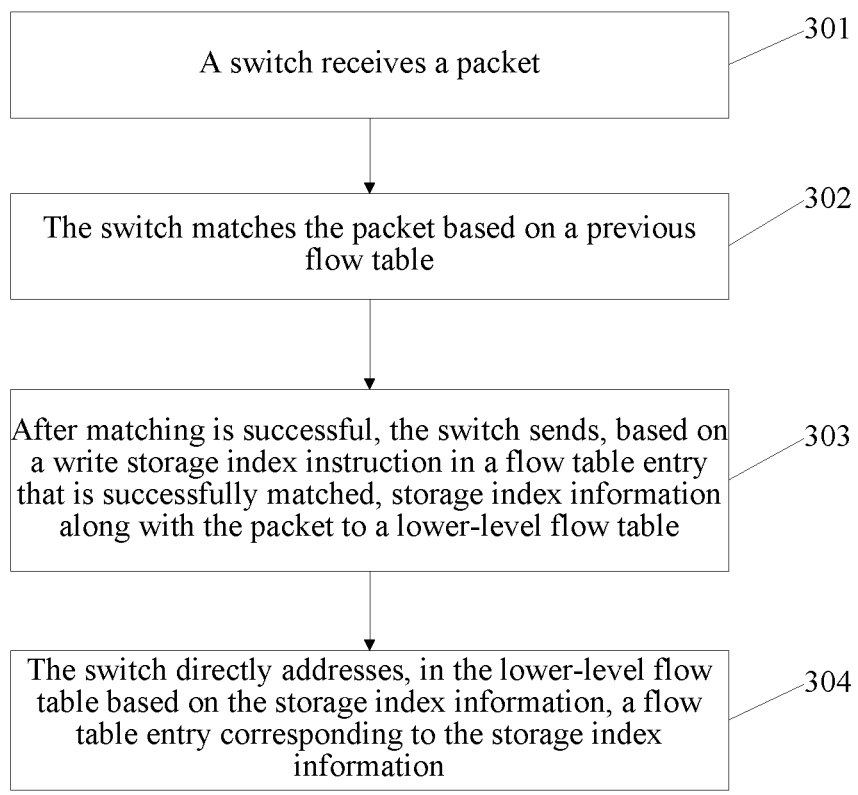
FIG. 4 is another schematic diagram of a process of a flow table-based table entry addressing method on a switch side according to an embodiment of the present application.

The following describes in detail how the switch implements table entry addressing based on the foregoing flow tables when a packet arrives. Referring to FIG. 4, FIG. 4 is a flowchart of a table entry addressing method according to an embodiment of the present application, where the method includes:

Step 301: A switch receives a packet.

Step 302: The switch matches the packet based on a previous flow table.

Step 303: After matching is successful, the switch sends, based on a write storage index instruction in a flow table entry that is successfully matched, storage index information along with the packet to a lower-level flow table, where, the storage index information corresponds to a flow table entry in the lower-level flow table, and the write storage index instruction is sent by a controller.

Step 304: The switch directly addresses, in the lower-level flow table based on the storage index information, the flow table entry corresponding to the storage index information.

In step 301, after the packet is received, the packet arrives at the previous flow table and step 302 is executed, that is, the packet is matched based on the previous flow table. Herein, it may be content matching and may also be metadata matching. When a certain flow table entry is matched, that is, matching is successful, the storage index information is sent, based on the write storage index instruction in the flow table entry, along with the packet to the lower-level flow table, which is, for example, specified by the goto table instruction.

When the packet arrives at the lower-level flow table and it is found carrying the storage index information, the table entry is directly addressed according to the storage index information, that is, step 304 is executed, and an instruction is executed.

In a practical application, when two or more than tow flow tables use direct indexing, after step 303 and before step 304, the method further includes: determining, by the lower-level flow table, whether the storage index information is generated by the lower-level flow table itself, and if yes, executing step 304. Therefore, a flow table can be prevented from incorrectly executing direct indexing and from executing an incorrect instruction. In a specific implementation process, determining whether storage index information is generated by a flow table itself may specifically be determining according to a flow table identifier in the storage index information.

In a further embodiment, to prevent introduction of extra determining operations that affect packet processing efficiency, a controller may send indication information to a switch to configure a certain flow table not to use direct indexing. Then, when receiving a packet, the flow table that does not use direct indexing no longer needs to perform a determining, but instead directly executes a matching operation, that is, step 302 is executed again until the packet arrives at a lower-level flow table that uses direct indexing, then step 304 is executed.

The following describes in detail several specific examples. First, refer to FIG. 5. In this embodiment, two levels of flow tables are included, where, a table 1 uses direct indexing, and the method includes:

Step 401: A controller delivers a flow table modification message to the table 1, where, the message indicates generation of a new flow table entry (OFPFC_ADD), and the message further includes a return storage index indication, may further include matched content, which facilitates implementation of content matching when direct indexing is not used, and also correspondingly includes instructions. The format of the message is, for example, Flow Table Mod(OFPFC_ADD, return index flag, match, instructions).

Step 402: According to the return storage index indication in step 401, the table 1 feeds back a flow table modification response message to the controller, where, storage index information is fed back in the message, such as the foregoing described address information of the flow table entry. The format of the message is, for example, Flow Table Mod ack (return index).

Step 403: The controller delivers to the table 0 a message of modifying or generating a flow table entry, where the message carries, in addition to matched content and instructions, a write storage index instruction, where, a parameter of the storage index instruction includes the storage index information returned in step 402. The format of the message is Flow Table Mod (OFPFC_ADD/mod, match, write index (index), other instructions).

Step 404: A packet arrives at the table 0.

Step 405: A matching operation is executed. After a certain flow table entry is successfully matched, instructions in the flow table entry are executed. This includes associating, according to the write storage index instruction, the parameter (storage index information) with the packet.

Step 406: The packet is sent along with the storage index information to a lower-level flow table.

Step 407: After the packet arrives at the table 1, if the table 1 finds that the packet carries the storage index information, the flow table entry is directly indexed according to the storage index information. Further, the instructions in the flow table entry are executed.

It may be seen from this embodiment, a controller instructs a switch to return storage index information of an entry in a lower-level flow table and update it to a flow table entry of a previous flow table. When the previous flow table is successfully matched, the storage index information is transmitted to the lower-level flow table, and the lower-level flow table may use the storage index information to directly address the flow table entry to prevent a problem of too low efficiency or complicated operations caused by use of metadata matching to address flow table entries.

Figure 6:
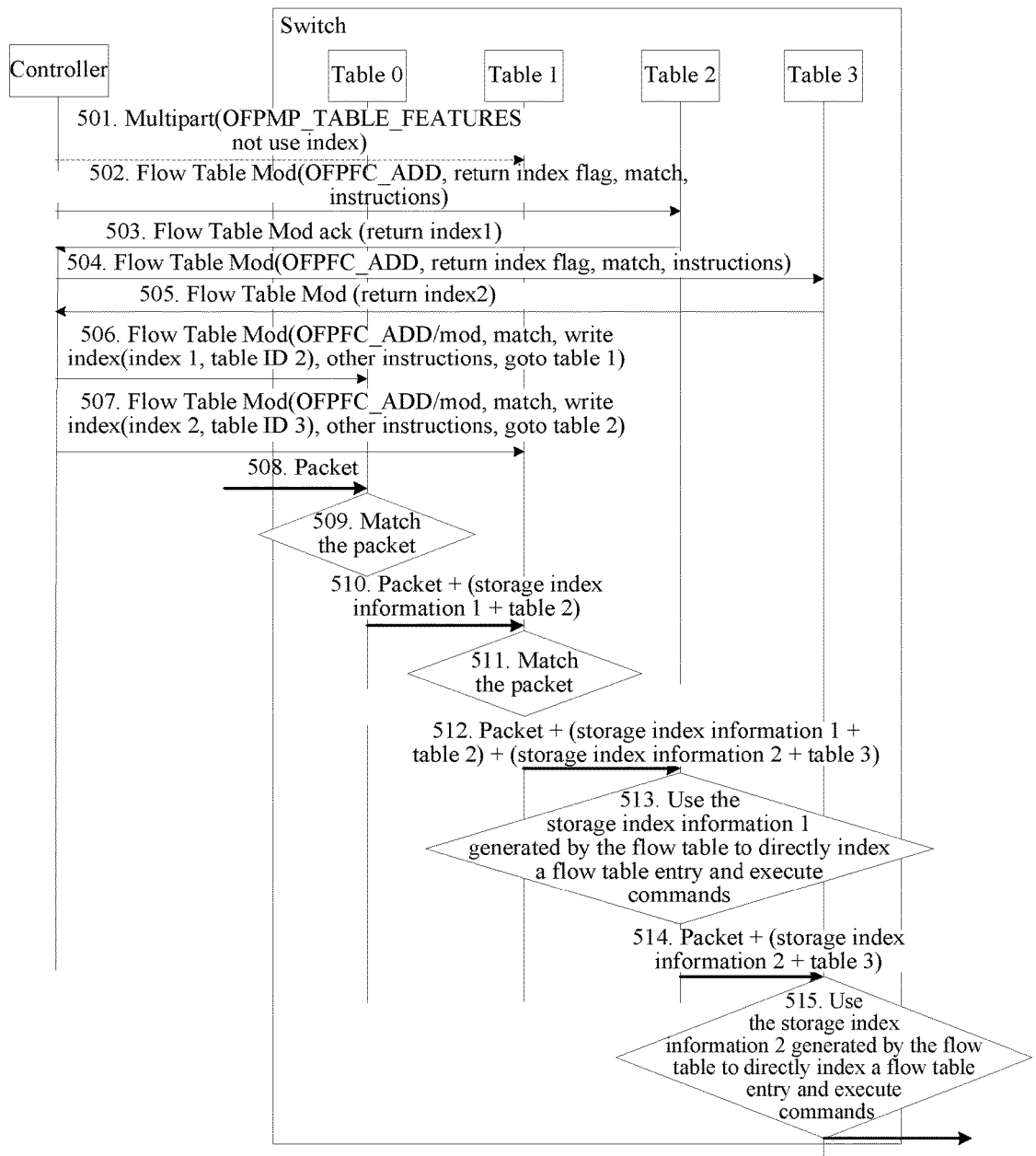
FIG. 6 is a schematic diagram of a specific instance of a flow table-based table entry addressing method according to another embodiment of the present application.

Next, refer to FIG. 6. In this embodiment, four flow tables are included, where, a table 2 and a table 3 use direct indexing and a table 0 and a table 1 use content matching. The method includes:

Step 501: This step is optional. A controller may use a multipart message to instruct the table 1 not to use direct indexing, so as to prevent a packet that carries index information from interrupting normal processing by the table 1. That is, when the packet arrives at the table 1, the table 1 does not need to determine whether storage index information is generated by the table 1 itself, which may increase packet processing efficiency. When this step is not executed, during processing by the table 1, a determining step is added before step 511 to determine whether the storage index information 1 is generated by the table 1 itself.

The specific format of the message may be Multipart (OFPMP_TABLE_FEATURES not use index).

Step 502: The controller delivers a flow table entry modification message to the table 2, where, the message indicates generation of a new flow table entry (OFPFC_ADD), and the message further includes a return storage index indication, may further include matched content, which facilitates implementation of content matching when direct indexing is not used, and also correspondingly includes instructions. The format of the message is, for example, Flow Table Mod(OFPFC_ADD, return index flag, match, instructions).

Step 503: According to the return storage index indication in step 502, the table 2 feeds back a flow table modification response message to the controller, where, storage index information is fed back in the message, such as the foregoing described address information of the flow table entry. The format of the message is, for example, Flow Table Mod ack (return index1).

Step 504: Similar to step 502, the controller delivers a flow table entry modification message to the table 3, where, the message indicates generation of a new flow table entry of information (OFPFC_ADD), and the message further includes a return storage index indication, may further include matched content, which facilitates implementation of content matching when direct indexing is not used, and also correspondingly includes instructions. The format of the message is, for example, Flow Table Mod(OFPFC_ADD, return index flag, match, instructions).

Step 505: According to the return storage index indication in step 504, the table 3 feeds back a flow table modification response message to the controller, where, storage index information is fed back in the message, such as the foregoing described address information of the flow table entry. The format of the message is, for example, Flow Table Mod (return index2).

Step 506: The controller delivers to the table 0 a message of modifying or generating a flow table entry, where the message carries, in addition to matched content and instructions, a write storage index instruction, where, a parameter of the storage index instruction includes the storage index information 1 returned in step 503. Furthermore, in this embodiment, because multiple flow tables use direct indexing, the parameter further includes a flow table identifier of a flow table that generates the storage index information. In this embodiment, the storage index information includes the storage index information 1 and the flow table identifier. Furthermore, the controller further delivers a goto table 1 (goto table 1) instruction and the format of the message is Flow Table Mod(OFPFC_ADD/mod, match, write index (index 1, table ID 2), other instructions, goto table 1).

Step 507: The controller delivers to the table 1 a message of modifying or generating a flow table entry, where the message carries, in addition to matched content and instructions, a write storage index instruction, where, a parameter of the storage index instruction includes the storage index information 2 returned in step 505. Furthermore, in this embodiment, because multiple flow tables use direct indexing, the parameter further includes a flow table identifier of a flow table that generates the storage index information. In this embodiment, the storage index information includes the storage index information 2 and the flow table identifier. Furthermore, the controller further delivers a goto table 2 (goto table 2) instruction and the format of the message is Flow Table Mod(OFPFC_ADD/mod, match, write index (index 2, table ID 3), other instructions, goto table 2).

Step 508: The packet arrives at the table 0.

Step 509: Matching is executed based on the table 0. When a certain flow table entry is successfully matched, step 510 is executed: send the parameter (the storage index information 1 and the flow table identifier of the table 2) of the write storage index instruction along with the packet to the lower-level flow table 1 (specified by the goto table 1 instruction).

After the packet arrives at the table 1, because the table 1 has been configured not to use direct indexing, the table 1 does not need to process the storage index information carried along with the packet, and step 511 is executed, that is, a matching operation is executed. After a certain flow table entry is successfully matched, step 512 is executed, that is, the parameter of the write storage index instruction (the storage index information 2 and the flow table identifier of the table 3) is sent, according to the write storage index instruction in step 507, along with the packet to the lower-level flow table 2. The storage index information added in this step and the storage index information added in the step 510 are in an overlapping relationship, that is, they do not overwrite each other.

After the packet arrives at the table 2, if the flow table 2 finds that the packet carries storage index information, step 513 is executed to determine, according to the identifier, of the flow table that generates the index, which is carried in the packet, whether the index is generated by the flow table 2 itself. If it is generated by the flow table 2 itself, a table entry is directly addressed according to the storage index information and instructions are executed. In this embodiment, a determining result is that the storage index information 1 is generated by the table 2. Therefore a flow table entry is directly addressed according to the storage index information 1 and instructions are further executed. Then, step 514 is executed to send the packet to the flow table 3. In this case, the storage index information 2 and the flow table identifier of the table 3 are sent along with the packet.

After the packet arrives at the table 3, if the flow table 3 finds that the packet carries storage index information, step 515 is executed to judge, according to the identifier, of the flow table that generates the index, which is carried in the packet, whether the index is generated by the flow table 3 itself. If it is generated by the flow table 3 itself, a table entry is directly addressed according to the storage index information and instructions are executed. In this embodiment, a determining result is that the storage index information 2 is generated by the table 3. Therefore a flow table entry is directly addressed according to the storage index information 2 and instructions are further executed.

Figure 7:
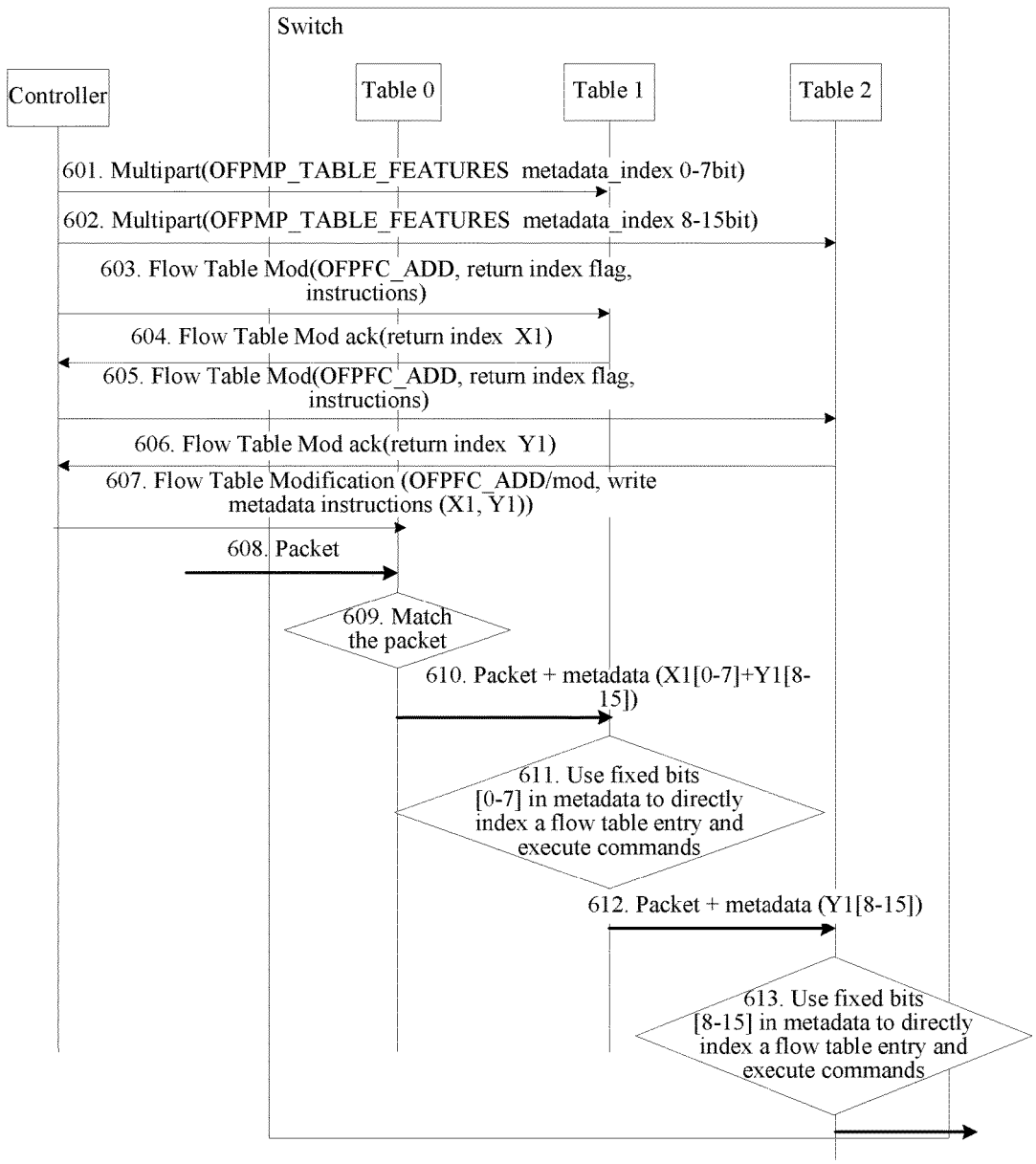
FIG. 7 is a schematic diagram of a specific instance of a flow table-based table entry addressing method according to still another embodiment of the present application.

In the foregoing two embodiments, the write storage index instruction uses a newly defined operation instruction. The following introduces an embodiment in which a write metadata instruction is reused. As shown in FIG. 7, the method includes:

Step 601: A controller uses a multipart message to instruct a flow table 1 to use fixed bits in metadata as storage index information. For this embodiment, the bits 0 to 7 in metadata are used to transmit index information. Actually, this also restricts that the flow table may use only 256 (2 to the power 8) flow table entries. The controller may determine, according to the number of flow table entries supported by the flow table, the bits occupied. For example, if the flow table 1 uses 1000 table entries, 10 bits need to be allocated to it. The format of the message may be Multipart(OFPMP_TABLE_FEATURES metedata_index 0-7 bit).

Step 602: The controller uses a multipart message to instruct a flow table 2 to use fixed bits in metadata as an index. For this embodiment, the bits 8 to 15 in metadata are used to transmit index information. It should be noted that bits configured for different flow tables using direct indexing do not overlap. The format of the message may be Multipart (OFPMP_TABLE_FEATURES metedata_index 8-15 bit).

Step 603: The controller delivers a flow table entry modification message to the flow table 1, where, the message indicates generation of a new flow table entry of information (OFPFC_ADD) and the message further carries a return storage index indication. The storage index information cannot exceed a bit range limitation configured in step 601, that is, cannot exceed 255 in this embodiment. The format of the message may be Flow Table Mod(OFPFC_ADD, return index flag, instructions).

Step 604: After generating a flow table entry, the flow table 1 returns, according to the indication in step 603, corresponding storage index information X1. The format of the message may be Flow Table Mod ack(return index X1).

Step 605: The controller delivers a flow table entry modification message to the flow table 2, where, the message indicates generation of a new flow table entry of information (OFPFC_ADD) and the message further carries a return storage index indication. The storage index information cannot exceed a bit range limitation configured in step 602 that is, cannot exceed 255 in this embodiment. The format of the message may be Flow Table Mod(OFPFC_ADD, return index flag, instructions).

Step 606: After generating a flow table entry, the flow table 2 returns, according to the indication in step 605, corresponding storage index information Y1. The format of the message may be Flow Table Mod ack(return index Y1).

Step 607: The controller delivers to the flow table 0 a message of a new table entry or modifying an original table entry, delivers, in addition to an original content matching instruction, a write metadata instruction, and writes the storage index information X1 returned in step 604 and the storage index information Y1 returned in step 606 in specified bits of the metadata. This process does not need to extend the open flow protocol but uses an existing mechanism. It should be noted that, compared with the embodiment in FIG. 6, because specific bits have been restricted to direct indexing of specific flow tables, identifiers of flow tables that generate storage index information do not need to be additionally written in the metadata Step 608: When a packet arrives at the table 0, step 609 is then executed, that is, a matching operation is executed. After a certain flow table entry is successfully matched, step 610 is executed to write, according to a write metadata instruction, a parameter of the write metadata instruction in fixed bits of the metadata and send the metadata along with the packet to the lower-level flow table 1.

After the packet arrives at the table 1, step 611 is executed, that is, values in the fixed bits of the metadata, which are bits 0 to 7 in this embodiment, are used to directly index a flow table entry, and instructions of the flow table entry are further executed.

Then, step 612 is executed to send the packet and the metadata to the table 2. After the packet arrives at the table 2, step 613 is executed, that is, the fixed bits, which are bits 8 to 15, in the metadata are used to directly index a flow table entry according to the values in the fixed bits, and instructions of the flow table entry are further executed.

It may be seen from the foregoing description, in this embodiment of the present application, first, a flow table entry of a previous flow table has a write storage index instruction, and storage index information can be sent, based on the write storage index instruction, along with a packet to a lower-level flow table. Then, when the lower-level flow table receives the packet, a flow table entry corresponding to the storage index information may be directly located according to the storage index information without a need of. in the lower-level flow table, implementing content matching one by one or implementing addressing by means of a hash operation, which can therefore resolve the technical problems of low efficiency and complex operations, that is, high costs, caused by use of metadata matching causes, achieve the technical effects of increasing a packet processing speed and reducing packet processing delays, and enable an open flow switch to achieve packet forwarding at higher line rates and lower device costs.

Furthermore, for a flow table that uses direct indexing, after a flow table entry is released for reasons such as timeout, processing of the flow table entry is different from processing of a flow table entry that uses content matching. For a content-matching flow table entry, after it is released, its memory location may immediately be used by a new flow table entry. After a packet that matches the content of an original table entry arrives, because there is no matched flow table entry, the packet is processed according to a universal process and no error will be caused. For a directly indexed flow table, after it is deleted, if its memory location is used by a new flow table entry and the previous flow table has not released an original memory index instruction, a packet, that is indexed to an original flow table entry, is directly indexed to a new flow table entry and instructions corresponding to the new flow table entry are incorrectly executed. This type of mistake cannot be detected by a controller or a switch. Therefore, releasing a directly indexed flow table entry requires a strict synchronization process. The following describes in detail a process of interaction between a controller and a switch when a flow table entry that uses direct indexing is released.

Figure 8:
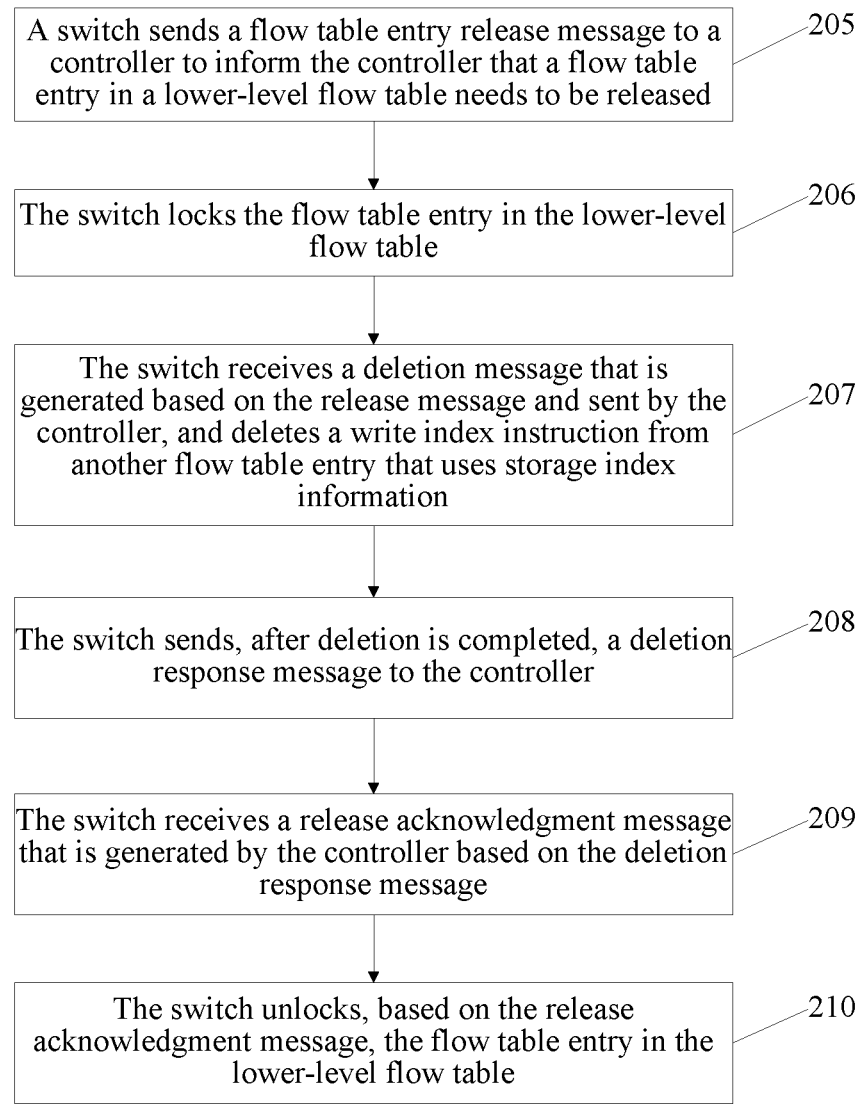
FIG. 8 is a flowchart of a flow table entry releasing method on a switch side according to an embodiment of the present application.

First, referring to FIG. 8, FIG. 8 is specifically a flowchart of a method described from a switch side, including:

Step 205: The switch sends a flow table entry release message to the controller to inform the controller that a flow table entry in a lower-level flow table needs to be released.

Step 206: The switch locks the flow table entry in the lower-level flow table.

Step 207: The switch receives a deletion message that is generated based on the release message and sent by the controller, and deletes a write index instruction from another flow table entry that uses storage index information.

Step 208: The switch sends, after deletion is completed, a deletion response message to the controller.

Step 209: The switch receives a release acknowledgement message that is generated by the controller based on the deletion response message.

Step 210: The switch unlocks, based on the release acknowledgement message, the flow table entry in the lower-level flow table.

Figure 9:
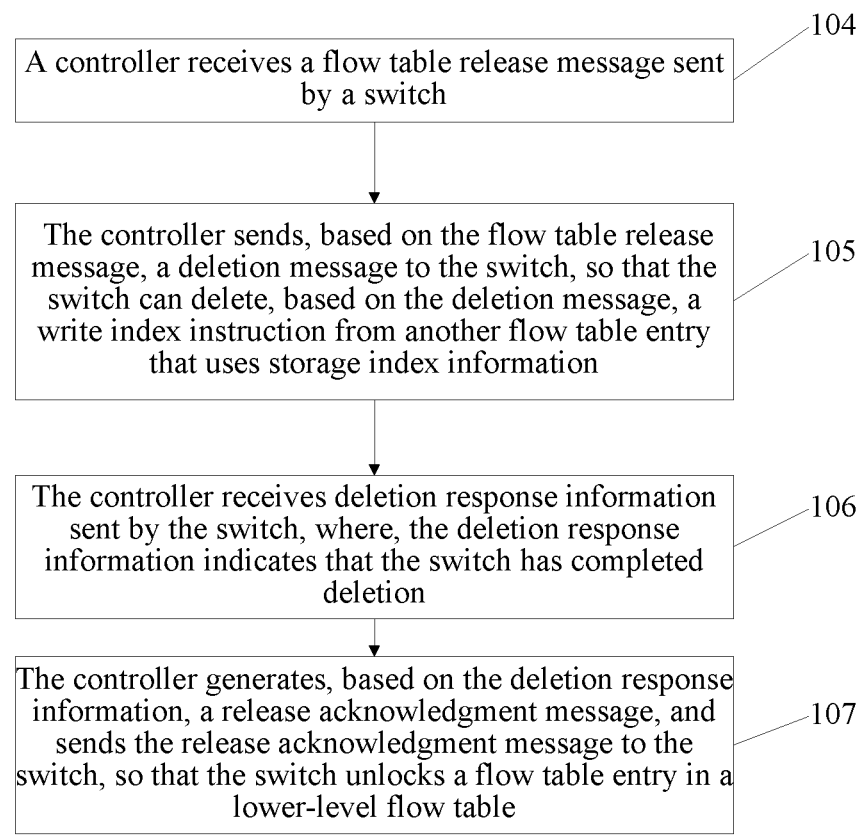
FIG. 9 is a flowchart of a flow table entry releasing method on a controller side according to an embodiment of the present application.

Then, referring to FIG. 9, FIG. 9 is specifically a flowchart of a method described from a controller side, including:

Step 104: The controller receives a flow table release message sent by the switch.

Step 105: The controller sends, based on the flow table release message, a deletion message to the switch, so that the switch can delete, based on the deletion message, a write index instruction from another flow table entry that uses storage index information.

Step 106: The controller receives deletion response information sent by the switch, where, the deletion response information indicates that the switch has completed the deletion.

Step 107: The controller generates, based on the deletion response information, a release acknowledgement message and sends the release acknowledgement message to the switch, so that the switch unlocks a flow table entry in the lower-level flow table.

Referring to both FIG. 8 and FIG. 9, when the switch needs to release a flow table entry because of a certain cause that, for example, no packet is indexed to a flow table entry for a long time, which causes flow table entry timer timeout, the switch executes step 205 to send a flow table release message to the controller to inform the controller that a flow table entry in a lower-level flow table needs to be released. The release message may include storage index information or matched content of the flow table entry for the controller to determine the flow table entry that needs to be released. In or after step 205, the switch further executes step 206, that is, it locks the flow table entry in the lower-level flow table. A storage location of the locked flow table entry cannot be used for storing another new flow table entry until a release acknowledge is received in step 209.

If a packet arrives at the lower-level table in the period when the flow table entry is locked, the switch discards the packet, or the switch sends a packet message to the controller, where, the packet message carries the packet, the storage index information, and a cause value of invalid storage index information. If no packet arrives in the locking period, then this operation is not executed.

Corresponding to step 205, the controller executes step 104, that is, it receives the flow table release message sent by the switch, and then the controller executes step 105, that is, it sends, based on the flow table release message, a deletion message to the switch, so that the switch can delete, based on the deletion message, a write index instruction from another flow table entry that uses the storage index information.

Corresponding to step 105, the switch executes step 207, that is, it receives the deletion message and deletes the write index instruction from another flow table entry that uses the storage index information. After deletion is completed, the switch executes step 208, that is, it sends a deletion response message to the controller to inform the controller that the deletion has been completed. This may prevent the occurrence of a case in which a packet is indexed to an incorrect flow table entry in a lower-level flow table before deletion is completed for other flow table entries because the controller directly executing step 107. Therefore, in this embodiment, deletion response information is added, so that the controller knows exactly whether the switch has completed deletion.

After receiving deletion response information in step 106, the controller executes step 107, that is, it generates, based on the deletion response information, a release acknowledgement message and sends the release acknowledgement message to the switch, so that the switch unlocks the flow table entry in the lower-level flow table. Correspondingly, the switch executes step 209 to receive the release acknowledgement information and executes step 210, that is, it unlocks the flow table entry in the lower level flow table. After the unlocking, when the controller subsequently executes step 101 again to deliver a new flow table entry, the memory location may be used again.

Figure 5:
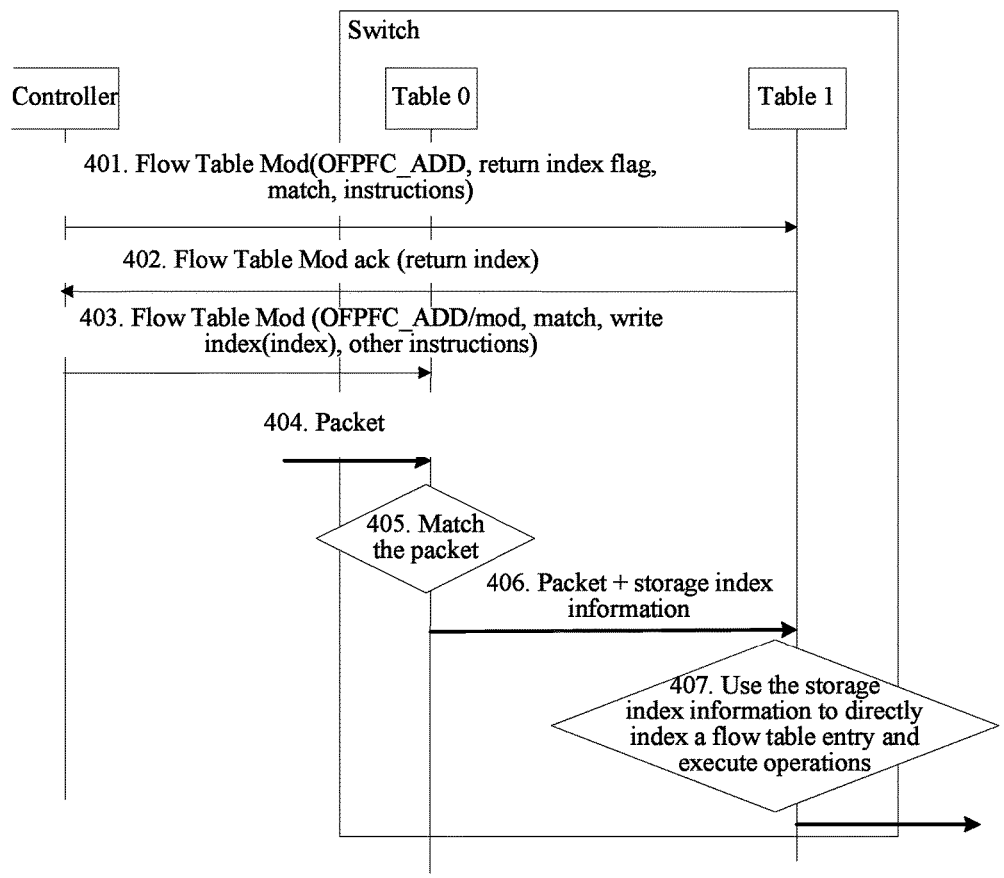
FIG. 5 is a schematic diagram of a specific instance of a flow table-based table entry addressing method according to an embodiment of the present application.
Figure 10:
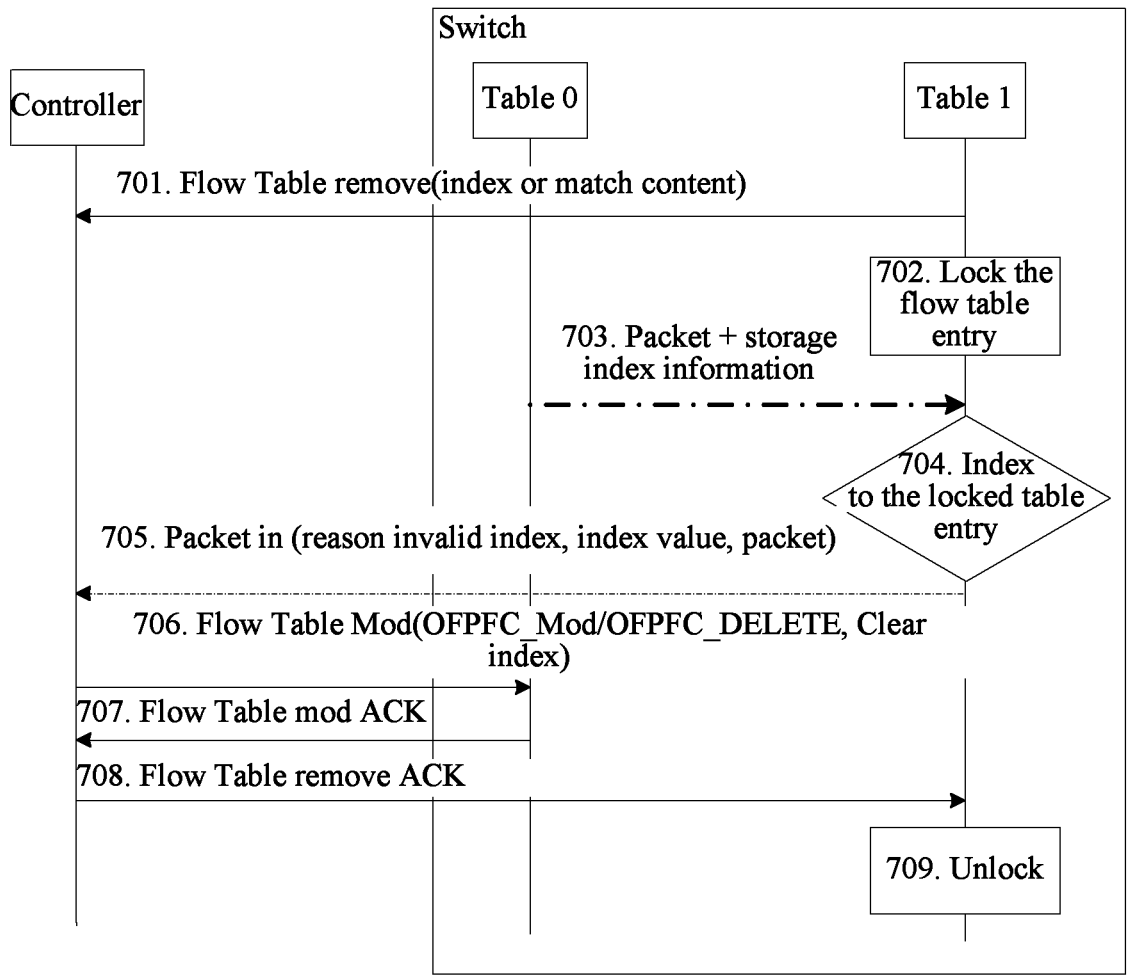
FIG. 10 is a schematic diagram of a specific flow table entry releasing instance according to an embodiment of the present application.

Next, referring to FIG. 10, FIG. 10 is a specific instance of releasing a flow table entry and is similar to the case in FIG. 5. The method includes:

Step 701: A table 1 sends a flow table release message to the controller, where, the message includes storage index information or matched content of the flow table entry. The format of the message may be Flow Table remove(index or match content).

Step 702: The switch locks the flow table entry.

In the locking period, step 703 to step 705 may be executed, that is, if the table 1 receives a packet and storage index information, step 704 is executed to index the packet to the locked flow table entry. Then the switch can send a packet message to the controller, where, the message may include the packet, the storage index information, and a cause value of invalid storage index information. The format of the packet message may be Packet in (reason invalid index, index value, packet).

Then, the controller executes step 706 to send a flow table modification message to a table 0. The message is used to indicate that the table 0 is to delete a write index instruction from a flow table entry that uses the storage index information. The format of the message may be Flow Table Mod (OFPFC_Mod/OFPFC_DELETE, Clear index).

After deletion is completed, the table 0 sends a flow table modification acknowledgment message to the controller to inform the controller that the deletion has been completed. The format of the message may be Flow Table mod ACK.

Next, the controller executes step 708 to send a flow table release acknowledgement message to the table 1 to inform the switch to execute step 709 to unlock the flow table entry. The format of the message may be Flow Table remove ACK.

It may be seen from the foregoing description, a control process between a controller and a switch is used, so that, when a flow table entry is released, incorrect execution of instructions corresponding to flow table entries, which leads to incorrect packet processing, is not caused.

Embodiment 2

Figure 11:
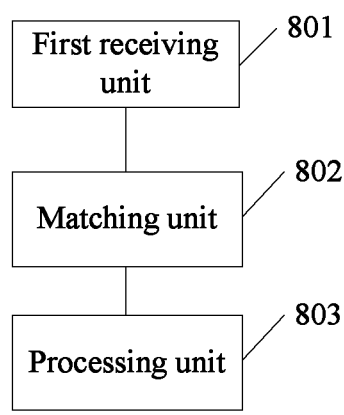
FIG. 11 is a functional block diagram of a switch according to Embodiment 2 of the present application.

An embodiment of the present application further provides a switch, as shown in FIG. 11. The switch includes: a first receiving unit 801, configured to receive a packet; a matching unit 802, configured to match the packet based on a previous flow table; and a processing unit 803, configured to send, after matching is successful, based on a write storage index instruction in a flow table entry that is successfully matched, storage index information along with the packet to a lower-level flow table, where, the storage index information corresponds to a flow table entry in the lower-level flow table and the write storage index instruction is sent by a controller, and directly address, in the lower-level flow table based on the storage index information, the flow table entry corresponding to the storage index information.

Further, the switch further includes: a second receiving unit, configured to receive the successfully matched flow table entry that carries the write storage index instruction and is sent by the controller, where, a parameter of the write storage index instruction includes the storage index information.

In a further embodiment, the switch further includes a first sending unit, and the second receiving unit is further configured to receive a message of generating or modifying a flow table entry in a lower-level flow table and sent by a controller. The message carries a return storage index indication, and the first sending unit is configured to send, based on the return storage index indication, storage index information corresponding to a flow table entry of the lower-level flow table to the controller.

Optionally, the write storage index instruction is specifically a write metadata instruction, and the processing unit 803 is specifically configured to write storage index information in fixed bits of metadata and send the metadata along with a packet to a lower-level flow table.

In a further embodiment, the switch further includes a second sending unit and a third receiving unit. The second sending unit is configured to send a flow table entry release message to a controller to inform the controller that a flow table entry in a lower-level flow table needs to be released. The processing unit 803 is further configured to lock the flow table entry in the lower-level flow table. The third receiving unit is configured to receive a deletion message that is generated based on the release message and sent by the controller and delete a write index instruction from another flow table entry that uses storage index information. The second sending unit is further configured to send, after deletion is completed, a deletion response message to the controller. The third receiving unit is further configured to receive a release acknowledgement message generated based on the deletion response message by the controller. The processing unit 803 is further configured to unlock, based on the release acknowledgement message, the flow table entry in the lower-level flow table.

Further, when a flow table entry of a lower-level flow table is in a locked state, the processing unit 803 is further configured to discard the packet, or the second sending unit is further configured to send a packet message to the controller, where, the packet message carries the packet, the storage index information, and a cause value of invalid storage index information.

With reference to the foregoing embodiments, the storage index information includes address information of the flow table entry of the lower-level flow table, or address information of the flow table entry of the lower-level flow table and a flow table identifier of the lower-level flow table.

Further, the flow table identifier of the lower-level flow table is specifically generated by the processing unit 803 or a controller.

The various types of variations and specific instances in the flow table-based table entry addressing methods in the foregoing embodiments in FIG. 2 to FIG. 4 are also applicable to the switch in this embodiment. With the detailed description of foregoing flow table-based table entry addressing methods, a person of ordinary skill in the art may clearly understand the implementation manner of the switch in this embodiment. Therefore, for conciseness of the specification, detailed description is not repeatedly provided herein.

Embodiment 3

Figure 12:
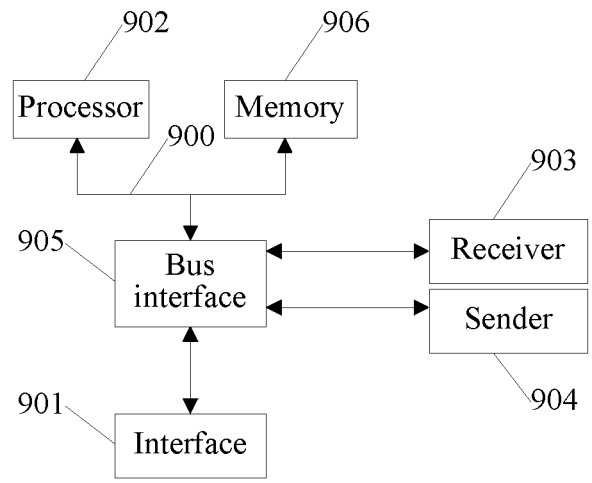
FIG. 12 is a concept diagram of a hardware implementation instance of a switch according to Embodiment 3 of the present application.

This embodiment provides a switch. Referring to FIG. 12, FIG. 12 is a concept diagram of a hardware implementation instance of the switch. The switch includes: an interface 901, configured to receive a packet; a processor 902, configured to match the packet based on a previous flow table, after matching is successful, send, based on a write storage index instruction in a flow table entry that is successfully matched, storage index information along with the packet to a lower-level flow table, where, the storage index information corresponds to a flow table entry in the lower-level flow table and the write storage index instruction is sent by a controller; and directly address, in the lower-level flow table based on the storage index information, the flow table entry corresponding to the storage index information.

In FIG. 12, there is a bus 900 architecture (represented by a bus 900). The bus 900 may include any number of interconnected buses 900 and bridges. The bus 900 links together various types of circuits of one or more processors 902 represented by a processor 902 and of memories 906 represented by a memory 906. The bus 900 may further link together various types of other circuits of peripheral devices, voltage stabilizers, power management circuits, and the like. This is publicly known in the art. Therefore, this specification does not further repeatedly describe it. A bus interface 905 provides the interface 901 between the bus 900 and a receiver 903 as well as a sender 904. The receiver 903 and the sender 904 may be a same component, that is, a transceiver, which provides a unit for communicating with various types of other apparatuses on transmission media. The interface 901 is further configured to export packets.

The processor 902 is responsible for bus 900 management and usual processing, while a memory 906 may be configured to store data used when the processor 902 executes operations and further be configured to store flow tables.

Further, the switch further includes: the receiver 903, configured to receive a successfully matched flow table entry that carries a write storage index instruction and is sent by a controller, where, a parameter of the write storage index instruction includes the storage index information.

Further, the switch further includes the sender 904 and the receiver 903 is further configured to receive a message of generating or modifying a flow table entry in a lower-level flow table and sent by the controller. The message carries a return storage index indication, and the sender 904 is specifically configured to send, based on the return storage index indication, the storage index information corresponding to the flow table entry of the lower-level flow table to the controller.

Optionally, the write storage index instruction is specifically a write metadata instruction, and the processor 902 is specifically configured to write storage index information in fixed bits of metadata and send the metadata along with a packet to a lower-level flow table.

In another embodiment, the switch further includes the sender 904 and the receiver 903, where, the sender 904 is configured to send a flow table entry release message to a controller to inform the controller that a flow table entry in a lower-level flow table needs to be released and send, after deletion is completed, a deletion response message to the controller, and the receiver 903 is configured to receive a deletion message that is generated based on the release message and sent by the controller, and receive a release acknowledgment message generated by the controller based on the deletion response message. The processor 902 is further configured to lock, after the sender 904 sends the flow table entry release message, the flow table entry in the lower-level flow table; delete, after the receiver 903 receives the deletion message, a write index instruction from another flow table entry that uses storage index information; and unlock, after the receiver 903 receives a release acknowledgement message, the flow table entry in the lower-level flow table.

In a further embodiment, when the switch locks a flow table entry of a lower-level flow table, the processor 902 is further configured to discard a packet, or the sender 904 is further configured to send a packet message to the controller, where, the packet message carries the packet, storage index information, and a cause value of invalid storage index information.

With reference to the foregoing embodiments, the storage index information includes address information of the flow table entry of the lower-level flow table, or address information of the flow table entry of the lower-level flow table and a flow table identifier of the lower-level flow table.

Further, the flow table identifier of the lower-level flow table is specifically generated by the processor 902 or a controller.

In this embodiment, a switch may specifically be a dedicated open flow switch, and may also be a switch that supports open flow.

The various types of variations and specific instances in the flow table-based table entry addressing methods in the foregoing embodiments in FIG. 2 to FIG. 4 are also applicable to the switch in this embodiment. With the detailed description of foregoing flow table-based table entry addressing methods, a person of ordinary skill in the art may clearly understand the implementation manner of the switch in this embodiment. Therefore, for conciseness of the specification, detailed description is not repeatedly provided herein.

Embodiment 4

Figure 13:
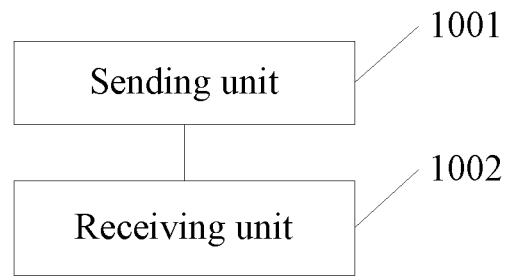
FIG. 13 is a functional block diagram of a controller according to Embodiment 4 of the present application.

This embodiment provides a controller, as shown in FIG. 13. The controller includes:

a sending unit 1001, configured to send a first message of generating or modifying a flow table entry in a lower-level flow table, to a switch, where, the first message carries a return storage index indication, and further configured to send a second message of modifying or creating a flow table entry of a previous flow table to the switch, where, the second message carries a write storage index instruction; a receiving unit 1002, configured to receive storage index information, of a flow table entry of the lower-level flow table, which is returned by the switch based on the return storage index indication, where, a parameter of the write storage index instruction include the storage index information, so that the switch can directly address, in the lower-level flow table based on the storage index information, the flow table entry corresponding to the storage index information.

The write storage index instruction is specifically: a newly defined operation instruction or a write metadata instruction, where, the storage index information is written in fixed bits of metadata.

Further, the storage index information includes address information of the flow table entry of the lower-level flow table, or address information of the flow table entry of the lower-level flow table and a flow table identifier of the lower-level flow table.

Further, the flow table identifier of the lower-level flow table is specifically generated by the switch or the processing unit of the controller.

Further, the receiving unit 1002 is further specifically configured to: receive a flow table release message sent by the switch, and receive deletion response information sent by the switch, where, the deletion response information indicates that the switch has completed deletion; and the sending unit 1001 is further specifically configured to: send, based on the flow table release message, a deletion message to the switch, so that the switch can delete, based on the deletion message, the write index instruction from another flow table entry that uses the storage index information, and generate a release acknowledgement message based on the deletion response information and send the release acknowledgement message to the switch, so that the switch unlocks the flow table entry in the lower-level flow table.

Further, the receiving unit 1002 is further specifically configured to receive a packet message sent by a switch, where, the packet message carries a packet, the storage index information, and a cause value of invalid storage index information.

The various types of variations and specific instances in the flow table-based table entry addressing methods in the foregoing embodiments in FIG. 2 to FIG. 4 are also applicable to the controller in this embodiment. With the detailed description of foregoing flow table-based table entry addressing methods, a person of ordinary skill in the art may clearly understand the implementation manner of the controller in this embodiment. Therefore, for conciseness of the specification, detailed description is not repeatedly provided herein.

Embodiment 5

Figure 14:
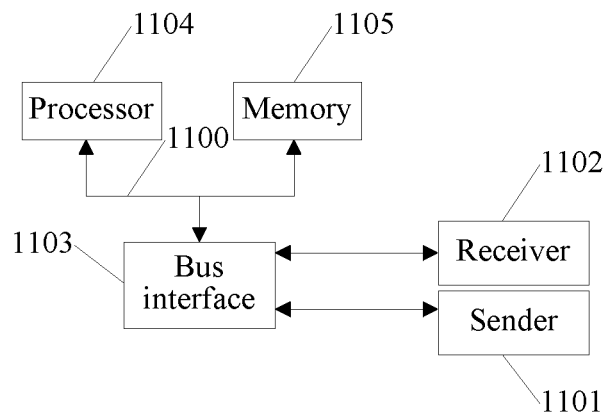
FIG. 14 is a concept diagram of a hardware implementation instance of a controller according to Embodiment 5 of the present application.

This embodiment provides a controller. Referring to FIG. 14, FIG. 14 is a block diagram of a hardware implementation instance of the controller. The controller may specifically be an open flow controller. The controller includes:

a sender 1101, configured to send a first message of generating or modifying a flow table entry in a lower-level flow table, to a switch, where, the first message carries a return storage index indication, and further configured to send a second message of modifying or creating a flow table entry of a previous flow table to the switch, where, the second message carries a write storage index instruction; and a receiver 1102, configured to receive storage index information, of a flow table entry of the lower-level flow table, which is returned by the switch based on the return storage index indication, where, a parameter of the write storage index instruction include the storage index information, so that the switch can directly address, in the lower-level flow table based on the storage index information, the flow table entry corresponding to the storage index information.

In FIG. 14, there is a bus 1100 architecture (represented by a bus 1100). The bus 1100 may include any number of interconnected buses 1100 and bridges. The bus 1100 links together various types of circuits of one or more processors 1104 represented by a processor 1104 and memories 1105 represented by a memory 1105. The bus 1100 may further link together various types of other circuits of peripheral devices, voltage stabilizers, power management circuits, and the like. This is publicly known in the art. Therefore, this specification does not further repeatedly describe it. A bus interface 1103 provides interfaces between the bus 1100 and the receiver 1102 and/or the sender 1101. The receiver 1102 and the sender 1101 may be a same component, that is, a transceiver, which provides a unit for communicating with various types of other apparatuses on transmission media.

The processor 1104 is responsible for bus 1100 management and usual processing. The processor 1104 is further configured to determine flow table entries, while the memory 1105 may be configured to store data used when the processor 1104 executes operations.

The processor 1104 can provide various types of functions, including timing, peripheral interfacing, voltage adjustment, power management, and other control functions.

In an embodiment, the receiver 1102 is further specifically configured to: receive a flow table release message sent by a switch, and receive deletion response information sent by the switch, where, the deletion response information indicates that the switch has completed deletion; and the sender 1101 is further specifically configured to: send, based on the flow table release message, a deletion message to the switch, so that the switch can delete, based on the deletion message, a write index instruction from another flow table entry that uses storage index information, and generate a release acknowledgement message based on the deletion response information and send the release acknowledgement message to the switch, so that the switch unlocks a flow table entry in a lower-level flow table.

Further, the receiver 1102 is further specifically configured to receive a packet message sent by a switch, where, the packet message carries a packet, the storage index information, and a cause value of invalid storage index information.

The write storage index instruction is specifically: a newly defined operation instruction or a write metadata instruction, where, the storage index information is written in fixed bits of metadata.

Further, the storage index information includes address information of the flow table entry of the lower-level flow table, or address information of the flow table entry of the lower-level flow table and a flow table identifier of the lower-level flow table.

Further, the flow table identifier of the lower-level flow table is specifically generated by the switch or the processor 1104 of the controller.

The various types of variations and specific instances in the flow table-based table entry addressing methods in the foregoing embodiments in FIG. 2 to FIG. 4 are also applicable to the controller in this embodiment. With the detailed description of foregoing flow table-based table entry addressing methods, a person of ordinary skill in the art may clearly understand the implementation manner of the controller in this embodiment. Therefore, for conciseness of the specification, detailed description is not repeatedly provided herein.

One or more technical solutions provided by embodiments of the present application have at least the following technical effects or advantages:

In the embodiments of the present application, a switch receives a packet; the switch matches the packet based on a previous flow table; after matching is successful, the switch sends, based on a write storage index instruction in a flow table entry that is successfully matched, storage index information along with the packet to a lower-level flow table, where, the storage index information corresponds to a flow table entry in the lower-level flow table, and the write storage index instruction is sent by a controller; and the switch directly addresses, in the lower-level flow table based on the storage index information, the flow table entry corresponding to the storage index information. Therefore, in the embodiments of the present application, first, a flow table entry of a previous flow table has a write storage index instruction and storage index information can be sent, based on the write storage index instruction, along with a packet to a lower-level flow table. Then, when the lower-level flow table receives the packet, a flow table entry corresponding to the storage index information may be directly located according to the storage index information without a need of implementing content matching one by one in the lower-level flow table, which can therefore resolve the technical problems of low efficiency and complicated operations caused by use of content matching, achieve the technical effects of increasing a packet processing speed and reducing packet processing delays, and enable an open flow switch to achieve packet forwarding at higher line rates and lower device costs.

A person skilled in the art should understand that, the embodiments of the present application may be provided as a method, a system, or a computer program product. Therefore, the present application may be implemented by hardware embodiments, software embodiments, or a combination thereof. Furthermore, the present application may be implemented by using a computer program product implemented on one or more computer-applicable storage media (which include but are not limited to a magnetic disk storage device and an optical memory) that include computer-applicable program code.

The present application is described with reference to the flowcharts and/or block diagrams of the methods, devices (systems), and computer program products according to the embodiments of the present application. It should be understood that every process and/or block in the flowcharts and/or block diagrams and combinations of processes and/or blocks in the flowcharts and/or block diagrams may be implemented by computer program instructions. The computer program instructions may be provided to processors of universal computers, dedicated computers, embedded processing machines, or other programmable data processing devices to generate a machine to enable the instructions executed by the processors of the computers or other programmable data processing devices to generate apparatuses for implementing the functions specified in one process or multiple processes in the flowcharts and/or one block or multiple blocks in the block diagrams.

The computer program instructions may also be stored in a computer readable memory that may lead computers or other programmable data processing devices to work in specified modes, so that the instructions stored in the computer readable storage devices generate products that include instruction apparatuses, where, the instruction apparatuses implement the functions specified in one process or multiple processes in the flowcharts and/or one block or multiple blocks in the block diagrams.

The computer program instructions may also be loaded to computers or other programmable data processing devices to enable a series of operation steps to be performed on the computers or other programmable data processing devices to implement computer processing, so that the instructions executed on the computers or other programmable data processing devices provide steps for implementing the functions specified in one process or multiple processes in the flowcharts and/or one block or multiple blocks in the block diagrams.

Apparently, a person skilled in the art can make various modifications and variations to the present application without departing from the spirit and scope of the present application. The present application shall be construed to include these modifications and variations, provided that these modifications and variations fall within the scope of the claims and equivalent technologies of the present application.

What is claimed is:

1. A flow table-based table entry addressing method, comprising:
   receiving, by a switch, a packet;
   matching, by the switch, the packet based on a previous flow table;
   sending, by the switch after matching is successful and based on a write storage index instruction in a flow table entry that is successfully matched, storage index information along with the packet to a lower-level flow table, wherein, the storage index information corresponds to a flow table entry in the lower-level flow table, and the write storage index instruction is obtained from a controller; and addressing, by the switch in the lower-level flow table based on the storage index information, the flow table entry corresponding to the storage index information.

2. The method according to claim 1, before receiving the packet, further comprising:
receiving, by the switch from the controller, the successfully matched flow table entry that carries the write storage index instruction, wherein, a parameter of the write storage index instruction comprises the storage index information.

3. The method according to claim 2, before receiving the successfully matched flow table entry that carries the write storage index instruction, further comprising:
receiving, by the switch from the controller, a message of generating or modifying a flow table entry in the lower-level flow table, wherein, the message carries a return storage index indication; and
sending, by the switch in response to the return storage index indication, the storage index information corresponding to the flow table entry of the lower-level flow table to the controller.

4. The method according to claim 2, wherein, the write storage index instruction comprises a newly defined operation instruction.

5. The method according to claim 2, wherein, the write storage index instruction comprises a write metadata instruction;
wherein sending the storage index information along with the packet to the lower-level flow table comprises: writing the storage index information in fixed bits of metadata and sending the metadata along with the packet to the lower-level flow table.

6. The method according to claim 1, wherein, the storage index information comprises address information of the flow table entry of the lower-level flow table, or address information of the flow table entry of the lower-level flow table and a flow table identifier of the lower-level flow table.

7. The method according to claim 6, wherein, the flow table identifier of the lower-level flow table is generated by the switch or the controller.

8. The method according to claim 1, further comprising:
sending, by the switch, a flow table entry release message to the controller to inform the controller that the flow table entry in the lower-level flow table needs to be released;
locking, by the switch, the flow table entry in the lower-level flow table;
receiving, by the switch from the controller, a deletion message that is generated in response to the release message, and deleting the write storage index instruction from another flow table entry that uses the storage index information;
sending, by the switch after deletion is completed, a deletion response message to the controller;
receiving, by the switch, a release acknowledgement message that is generated by the controller in response to the deletion response message; and
unlocking, by the switch in response to the release acknowledgement message, the flow table entry in the lower-level flow table.

9. The method according to claim 8, when the switch locks the flow table entry in the lower-level flow table, further comprising:
discarding, by the switch, the packet.

10. The method according to claim 8, when the switch locks the flow table entry in the lower-level flow table, further comprising:
sending, by the switch, a packet message to the controller, wherein, the packet message carries the packet, the storage index information, and a cause value of invalid storage index information.

11. A switch, comprising:
a receiver, configured to receive a packet;
a processor, configured to match the packet based on a previous flow table, and send, after matching is successful, based on a write storage index instruction in a flow table entry that is successfully matched, storage index information along with the packet to a lower-level flow table, wherein, the storage index information corresponds to a flow table entry in the lower-level flow table, and the write storage index instruction is obtained from a controller; and address, in the lower-level flow table based on the storage index information, the flow table entry corresponding to the storage index information.

12. The switch according to claim 11, wherein the receiver is further configured to receive, from the controller, the successfully matched flow table entry that carries the write storage index instruction, wherein, a parameter of the write storage index instruction comprises the storage index information.

13. The switch according to claim 12, further comprising a transmitter, wherein,
the receiver is further configured for the switch to receive, from the controller, a message, of generating or modifying a flow table entry in the lower-level flow table and sent by the controller, wherein, the message carries a return storage index indication; and
the transmitter is configured to send, in response to the return storage index indication, the storage index information corresponding to the flow table entry of the lower-level flow table to the controller.

14. The switch according to claim 12, wherein, the write storage index instruction is a write metadata instruction, and the processor is configured to write the storage index information in fixed bits of metadata and send the metadata along with the packet to the lower-level flow table.

15. The switch according to claim 11, further comprising a transmitter, wherein,
the transmitter is configured to send a flow table entry release message to the controller to inform the controller that the flow table entry in the lower-level flow table needs to be released;
the processor is further configured to lock the flow table entry in the lower-level flow table;
the receiver is configured to receive, from the controller, a deletion message that is generated in response to the release message, and delete the write storage index instruction from another flow table entry that uses the storage index information;
the transmitter is further configured to send, after deletion is completed, a deletion response message to the controller;
the receiver is further configured to receive a release acknowledgement message that is generated by the controller in response to the deletion response message; and
the processor is further configured to unlock, in response to the release acknowledgement message, the flow table entry in the lower-level flow table.

16. The switch according to claim 15, wherein, when the flow table entry in the lower-level flow table is in a locked state, the processor is further configured to discard the packet, or the transmitter is further configured to send a packet message to the controller, wherein, the packet message carries the packet, the storage index information, and a cause value of invalid storage index information.

17. A controller, comprising:

a transmitter, configured to send a first message of generating or modifying a flow table entry in a lower-level flow table, to a switch, wherein, the first message carries a return storage index indication, and further configured to send a second message of modifying or creating a flow table entry of a previous flow table to the switch, wherein, the second message carries a write storage index instruction; and a receiver, configured to receive storage index information, of a flow table entry of the lower-level flow table, which is returned by the switch in response to the return storage index indication, wherein, a parameter of the write storage index instruction comprises the storage index information, wherein the storage index information is used for addressing the flow table entry in the lower-level flow table.

18. The controller according to claim 17, wherein, the receiver is further configured to: receive a flow table release message from the switch, and receive deletion response information from the switch, wherein, the deletion response information indicates that the switch has completed deletion; and the transmitter is further configured to: send, in response to the flow table release message, a deletion message to the switch, wherein the deletion message is used for deleting the write storage index instruction from another flow table entry that uses the storage index information; generate, in response to the deletion response information, a release acknowledgment message and send the release acknowledgment message to the switch, wherein the release acknowledge message is used for unlocking of the flow table entry in the lower-level flow table.

19. The controller according to claim 18, wherein, the receiver is further configured to receive a packet message from the switch, wherein, the packet message carries a packet, the storage index information, and a cause value of invalid storage index information.

* * * * *